United States Patent
Gupta et al.

(10) Patent No.: US 9,830,379 B2
(45) Date of Patent: Nov. 28, 2017

(54) NAME DISAMBIGUATION USING CONTEXT TERMS

(75) Inventors: Nitin Gupta, Santa Clara, CA (US); Abhinandan S. Das, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 612 days.

(21) Appl. No.: 12/955,253

(22) Filed: Nov. 29, 2010

(65) Prior Publication Data

US 2014/0214840 A1    Jul. 31, 2014

(51) Int. Cl.
*G06F 17/30* (2006.01)

(52) U.S. Cl.
CPC ............... *G06F 17/3064* (2013.01)

(58) Field of Classification Search
USPC ......................................... 707/738
See application file for complete search history.

(56) References Cited

U.S. PATENT DOCUMENTS

| | | | |
|---|---|---|---|
| 6,006,221 A | 12/1999 | Liddy et al. | |
| 6,167,368 A | 12/2000 | Wacholder | |
| 6,263,335 B1 | 7/2001 | Paik et al. | |
| 6,968,332 B1* | 11/2005 | Milic-Frayling | G06F 17/30867 707/723 |
| 7,024,407 B2 | 4/2006 | Bradford | |
| 7,086,002 B2 | 8/2006 | Elo et al. | |
| 8,538,943 B1* | 9/2013 | Bau et al. ............. | 707/706 |
| 9,009,153 B2* | 4/2015 | Khan ............. | G06F 17/30864 707/734 |
| 2002/0026456 A1 | 2/2002 | Bradford | |
| 2002/0073115 A1 | 6/2002 | Davis | |
| 2004/0236725 A1 | 11/2004 | Amitay et al. | |
| 2005/0015366 A1 | 1/2005 | Carrasco et al. | |
| 2005/0149494 A1 | 7/2005 | Lindh et al. | |
| 2007/0067285 A1 | 3/2007 | Blume et al. | |
| 2007/0112720 A1* | 5/2007 | Cao et al. ............. | 707/1 |

(Continued)

OTHER PUBLICATIONS

Artiles et al. "Word Sense Disambiguation based on Term to Term Similarity in a Context Space," Third International Workshop on the Evaluation of Systems for the Semantic Analysis of Text. Barcelona, Spain. Jul. 2004. Association for Computational Linguistics. 6 pages.

(Continued)

*Primary Examiner* — Boris Gorney
*Assistant Examiner* — Bao Tran
(74) *Attorney, Agent, or Firm* — Fish & Richardson P.C.

(57) ABSTRACT

Methods, systems and apparatus, including computer programs encoded on a computer storage medium, for disambiguating names in a document corpus. In an aspect, a method includes generating context term lists for a person name, each context term list being a list of context terms from a resource for the person name; clustering the context term lists into a plurality of clusters, each of the clusters of context term lists including context term lists that are most similar to the cluster relative to other clusters; for each of the clusters, selecting a representative term for the cluster; receiving the person name as a search query; and generating a plurality of query suggestions from the search query and the representative terms for the clusters, each query suggesting being a combination of the person name and one representative term.

16 Claims, 3 Drawing Sheets

(56) References Cited

U.S. PATENT DOCUMENTS

| | | | |
|---|---|---|---|
| 2007/0233656 A1* | 10/2007 | Bunescu et al. .................. 707/3 |
| 2008/0147588 A1* | 6/2008 | Leffingwell et al. ........... 706/48 |
| 2008/0201319 A1* | 8/2008 | McNamar ............ G06F 19/3487 |
| 2009/0070325 A1* | 3/2009 | Gabriel ............. G06F 17/30705 |
| 2010/0125563 A1* | 5/2010 | Nair et al. ..................... 707/709 |
| 2011/0106807 A1* | 5/2011 | Srihari et al. ................. 707/739 |
| 2011/0119243 A1* | 5/2011 | Diamond .......... G06F 17/30867 |
| | | 707/706 |
| 2011/0184981 A1* | 7/2011 | Lu ....................... G06F 17/3087 |
| | | 707/774 |

OTHER PUBLICATIONS

Jing et al. "Information Retrieval Based on Context Distance and Morphology," SIGIR '99 Proceedings of the 22nd annual international ACM SIGIR conference on Research and development in information retrieval. ACM New York, NY. 1999; 90-96.

Malin, Bradley. "Unsupervised Name Disambiguation via Social Network Similarity," Proceedings of the Workshop on Link Analysis, Counterterrorism, and Security in conjuction with the SIAM International Conference on Data Mining. Newport Beach, CA. 2005; 93-102.

PCT Notification Concerning Transmittal of International Preliminary Report on Patentability dated May 8, 2008 with the PCT Written Opinion of the International Searching Authority, International Application No. PCT/US2005/45189, dated Sep. 18, 2007.

PCT Notification of Transmittal of International Search Report and Written Opinion for corresponding International Application No. PCT/US07/65800, dated Apr. 2, 2007.

Sekine, S.: "Named Entity: History and Future." http://cs.nyu.edu/\~sekine/papers/NEsurvey200402.pdf, 2004.

Shiren et al. "Querying and Clustering Web Pages about Persons and Organizations," Proceedings of the IEEE/WIC International Conference on Web Intelligence (2003), 7 pages.

Thorsten, J. "Optimizing Search Engines using Clickthrough Data," Proceedings of the Eighth ACM SIGKDD International Conference on Knowledge Discovery and Data Mining, Jul. 23-26, 2002; 133-142.

Tufis et al. "Fine-Grained Word Sense Disambiguation Based on Parallel Corpra, Word Alignment, Word Clustering, and Aligned Wordnets," Proceedings of the 20th international conference on Computational Linguistics, p. 1312-es, Aug. 23-27, 2004, Geneva, Switzerland.

Wacholder et al. "Disambiguation of Proper Names in Text," Preprint of paper to be published in the Proceedings of the 5th Applied Natural Language Processing Conference, Mar. 31 to Apr. 3, 1997, Washington D.C., 7 pages.

\* cited by examiner

NAME DISAMBIGUATION USING CONTEXT TERMS

BACKGROUND

The specification relates to information retrieval, and particularly to name disambiguation.

The Internet provides access to a wide variety of resources, for example, video files, image files, audio files, or Web pages including content for particular subjects, book articles, or news articles. A search system can select one or more resources in response to receiving a search query. A search query is data that a user submits to a search engine to satisfy the user's informational needs. The search system selects and scores resources based on their relevance to the search query and on their importance relative to other resources to provide search results that link to the selected resources. The search results are typically ordered according to the scores.

A very popular search scenario is searching on person names. As most person names are not unique, an initial search on a person name can yield multiple search results that each reference resources describing different persons. For example, a search on the name of "John Smith" may yield search results that reference resources with information about an explorer, resources about a botanist and curator of Kew Gardens, resources about a professional wrestler, and still other resources about other people that are named "John Smith." As search queries are often an incomplete expression of the information needed, the user will often revise the search query to focus in on search results. Such revisions including adding addition search terms to the name. For example, suppose the user is searching for information relating to the explorer John Smith's interactions with Chief Powhatan. The user may revise the query to read "John Smith Chief Powhatan." The search query will cause a search engine to provide search results that reference documents that are more likely to satisfy the user's informational needs.

Often, however, users may not have enough information or background knowledge about a person to effectively revise queries. Thus, the user may have to revise a query multiple times before he or she finds information that satisfies his or her informational needs.

SUMMARY

In general, one aspect of the subject matter described in this specification can be implemented in methods that include the actions of generating context term lists for a person name, each context term list being a list of context terms from a resource for the person name, and each of the resources to which the context term lists for the person name correspond being different resources; clustering the context term lists into a plurality of clusters, each of the clusters of context term lists including context term lists that are most similar to the cluster relative to other clusters; for each of the clusters, selecting a representative term for the cluster; receiving the person name as a search query; and generating a plurality of query suggestions from the search query and the representative terms for the clusters, each query suggesting being a combination of the person name and one representative term. These and other embodiments of this aspect can include corresponding systems, apparatus, and computer program products.

Particular embodiments of the invention can be implemented to realize one or more of the following advantages. Users are provided query suggestions for person names, and each suggestion is representative of a context associated with the name. Each context is used to disambiguate the name, and thus the user can quickly focus a search on an appropriate context without having to manually determine the various contexts. Person names that would otherwise have a dominant interpretation (e.g., names of famous people or historical figures) are disambiguated among contexts, and the dominant interpretation is limited to a proper subset of the contexts. Accordingly, the system can provide query suggestions for the dominant interpretation and multiple other contexts that are not associated with the dominant interpretation.

Additionally, resources that refer to the same person (i.e., a name disambiguated among contexts) can be separately clustered. The clustering of documents according to a disambiguated name facilitates data mining and other information gathering processes.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Given a user query for a person name, the apparatus and methods described in this detailed description generate a diverse set of query refinements that refer to different contexts of the person name. As will be described in more detail below, different contexts of a person name typically refer to different persons with the same name, and/or refers to disjoint aspects of the same person. For example, the name John Smith has contexts related to the explorer, a botanist, and a professional wrestler. Similarly, with respect to John Smith the explorer, different aspects can include his role in the fight for Dutch independence, and his role in the colony of Virginia.

To generate the different contexts for a name, the system first generates a set of context terms for each name. As used herein, "context terms" are terms that are determined to be indicative of a particular usage of a person name, the particular usage being indicative of a particular person or a particular aspect of a person. Context terms are described in more detail below.

After the context terms for a name are determined, the terms are clustered into different clusters. For example, terms related to the explorer John Smith, e.g., explorer, Virginia colony, Jamestown, etc., may form a cluster, while terms related to the botanist John smith, e.g., botany, Kew botanical gardens, curator, etc., may form a separate cluster.

Once the clusters are generated, a representative term for each cluster is selected. The representative term is added to the person name when the person name is received as a query, and presented as a suggested query refinement. For example, for the cluster related to John Smith the explorer, the representative term may be "explorer", and for the cluster related to John Smith the botanist, the representative term may be "botanist." Thus, when the query "John Smith" is received, two query suggestions that are generated are "John Smith explorer" and "John Smith botanist." A user that submitted the query "John Smith" may select one of the query suggestions to refine his or her search.

These features are described in more detail in the sections that follow.

§1.1 Example Environment

Figure 1:
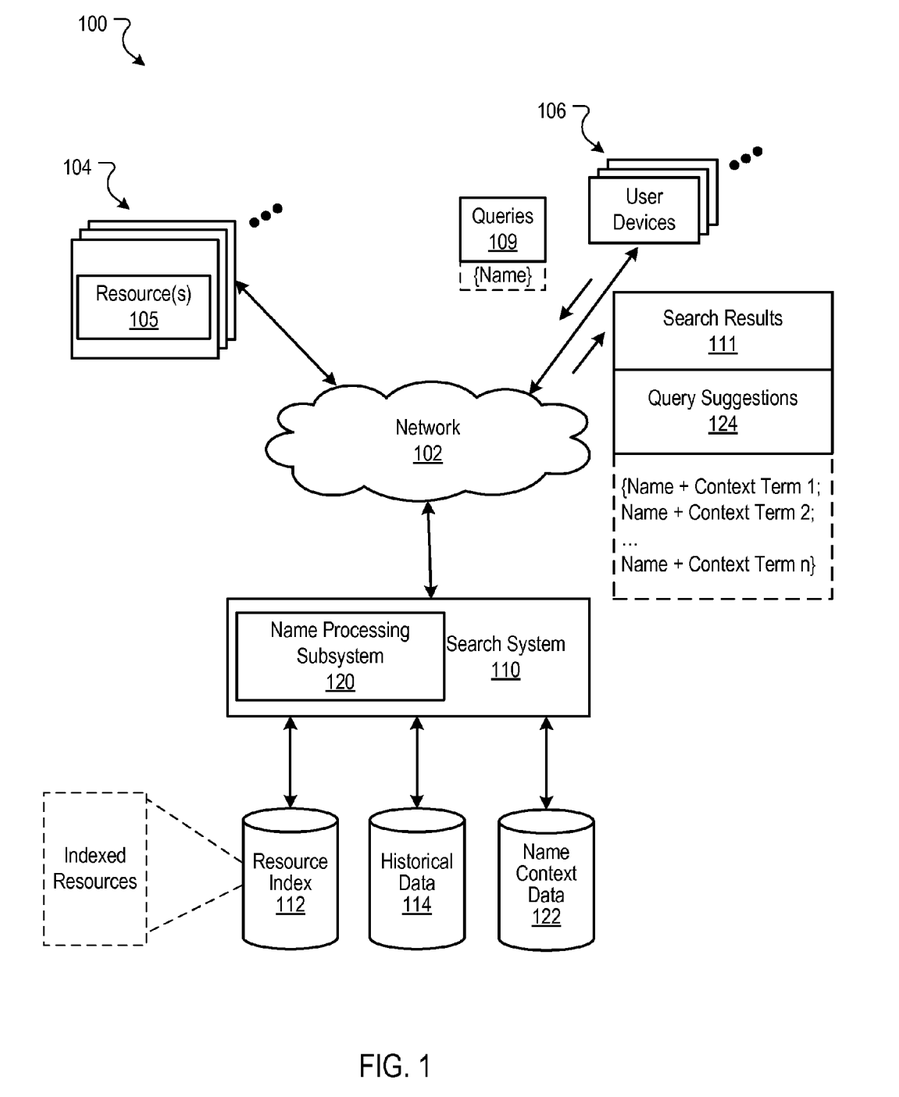
FIG. 1 is a block diagram of an example environment in which a search system provides search services that include query suggestions for disambiguated names.

FIG. 1 is a block diagram of an example environment 100 in which a search system 110 provides search services that include query suggestions for disambiguated names. The example environment 100 includes a network 102, e.g., a local area network (LAN), wide area network (WAN), the Internet, or a combination of them, connects web sites 104, user devices 106, and the search system 110. The environment 100 may include many thousands of web sites 104 and user devices 106.

A web site 104 is one or more resources 105 associated with a domain name and hosted by one or more servers. An example web site is a collection of Web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is any data that can be provided by a web site 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally, cached copies of the resources 105 are stored a resource index 112.

The user devices 106 submit search queries 109 to the search system 110. In response, the search system 110 accesses the indexed cache 112 to identify resources 105 that are relevant to the search query 109. The search system 110 identifies the resources 105, generates search results 111 that identify the resources 105, and returns the search results 111 to the user devices 106. As used herein, a search result 111 is data generated by the search system 110 that identifies a resource 105 that is responsive to a particular search query, and includes a link to the resource 105. An example search result 111 can include a Web page title, a snippet of text or a portion of an image (or thumbnail of the image) extracted from the Web page, and the URL of the Web page.

The search results are ranked based on scores related to the resources 105 identified by the search results 111, such as information retrieval ("IR") scores, and optionally an authority score that measures the importance of the resource relative to other resources. In some implementations, the IR scores are computed from dot products of feature vectors corresponding to a search query 109 and a resource 105, and the ranking of the search results is based on relevance scores that are a combination of the IR scores and the authority scores. The search results 111 are ordered according to these relevance scores and provided to the user device 106 according to the order.

The user devices 106 receive the search results 111, e.g., in the form of one or more web pages with each web page including multiple search results, and render the search results for presentation to users. In response to the user selecting a link in a search result at a user device 106, the user device 106 requests the resource 105 identified by the link. The web site 104 hosting the resource 105 receives the request for the resource from the user device 106 and provides the resource 105 to the requesting user device 106.

Data for the search queries 109 submitted during user sessions are stored in a data store, such as the historical data store 114. For example, for search queries, the text of the query is stored in the historical data store 114, and, optionally, data indicative of the search results provided for the query. Selection data specifying actions taken in response to search results provided in response to each search query are also stored in the historical data store 114. These actions can include whether a search result was selected, and for each selection, for which query the search result was provided. The data stored in the historical data store 114 can be used to map search queries 109 submitted during search sessions to resources 105 that were identified in search results 111 and the actions taken by users. For example, the historical data can map how many times search results for each resource indexed in the indexed cache 112 were provided, and how many times the search result was selected.

§1.2 Name Disambiguation Using Context Terms

As describe above, some the queries that are received are person names. When the search system 110 receives a query, it checks the query to determine if the query is or includes a person name. The system 110 can use various techniques for checking for person names, such as accessing a name dictionary, language analysis, etc. Such data can be stored in the name context data 122, which also stores the contexts and representative context terms for each name, as will be described in more detail below.

When a person name is detected, the system 110 passes the query to a name processing subsystem 120. The name processing subsystem 120 determines if the query is ambiguous. The name processing subsystem 120 makes this determination based on the absence of sufficient contextual terms to resolve an ambiguity. For example, the query "John Smith explorer Jamestown settlement" includes the contextual terms explorer, Jamestown and settlement. The name processing subsystem 120 compares these terms to the contexts associated with the name "John Smith," and determines that the context related to John Smith the explorer is highly relevant to the contextual terms, while all other contexts related to the name are much less relevant. Accordingly, the query is determined to not be ambiguous, and query suggestions for additional name contexts are not provided.

However, if the query is only "John Smith," or has contextual terms that map to different context, e.g., "John Smith significant events", then name processing subsystem 120 determines that the query is ambiguous, as the contextual terms (or lack of contextual terms) are not indicative of only one particular context. Accordingly, the potentially relevant contexts that are derived for the name John Smith are selected, and the name processing subsystem selects a representative term for each of the contexts (or a subset of n contexts). Once the terms are selected, the name processing subsystem 120 generates query suggestions 124 that are a combination of the person and the representative terms, e.g., Name+Context Term 1, Name+Context Term 2 . . . Name+Context Term n.

Figure 2:
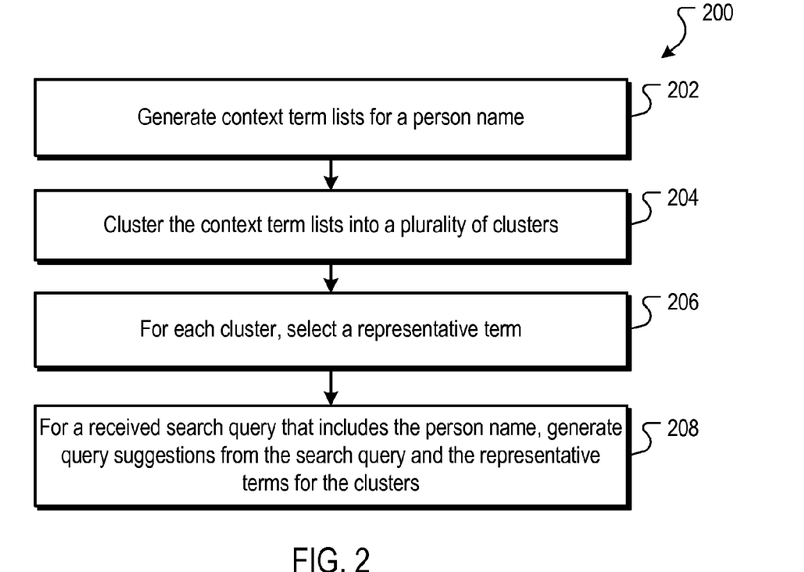
FIG. 2 is a flow diagram of an example process for disambiguating person names using context terms.

The process of creating the name context data and generating query suggestions from the representative terms is described with respect to FIG. 2, which is flow diagram of an example process 200 for disambiguating person names using context terms. Particular features and details of various aspects of the process 200 are separately described with respect to processes 300, 400 and 500 of FIGS. 3, 4 and 5 below.

The process 200, as well the processes 300, 400 and 500, are illustratively implemented in the name processing subsystem 120. The name processing subsystem 120 can be realized by one or more computers programmed to perform the processes described below, and computer memory devices in data communication with the computers that store program instructions and data.

The process 200 generates a context term list for a person name (202). Each context term list is a list of context terms from a corresponding resource for the person name, and each of the resources to which the context term lists for the person name correspond are different resources. For example, for the name John Smith, there are many web documents associated with the name (i.e., documents that include the name John Smith). For each one of these documents, a context term list is generated. Thus, for m different names, there are m sets of context term lists, i.e.:

Name 1: list 11, list 12, . . . list 1k;
Name 2: list 21, list 22, . . . list 2k;
. . . .
Name m: list m1, list m2, . . . list mk.

This process uses query logs in the historical data 114 and the resources of the resource index 112 to generate context terms that co-occur with the person name query in query logs and the resources. For example, the name processing subsystem 120 accesses the historical data 114 for queries for each resource indexed in the index 112, and the queries associated with each resource are selected for processing. For each resource, the queries are checked for names, and for each name that is found a corresponding context term list is created. This process is described in more detail with respect to FIG. 3 below.

As described in the example above, k context term lists correspond to the top k resources that are ranked according to ranking criteria. For each name, each resource for each context term list is a different resource. However, a particular resource may be used to for two different context term lists, if each of the lists corresponds to a different name. For example, a particular document may be used for a context term list for the name "Winston Churchill" and for the name "Bernard Montgomery."

Various ranking criteria can be used to rank the top k resources, such as relevance to the ambiguous name term, or a combination of relevance to the ambiguous name term and an authority score for the resource to which the context term list corresponds, etc. The value of k can vary on system resources and other processing criteria. For example, only the top 100 resources may be used for the creation of context lists; alternatively, the top 1,000, 2,000, or even the top 10,000 resources can be used.

The process 200 clusters the context term lists into a plurality of clusters (204). Each of the clusters of context term lists include context term lists that are most similar to the cluster relative to other clusters. In some implementations, the context term widows associated with each name are normalized with respect to that name. For example, terms that are close synonyms, have the same stems, are part of the same substrings/superstrings, etc., are normalized to a common term in each context term list for that name. For example, the terms "photographer," "photography," "photograph," "digital photography," etc., are collapsed into a single normalized form, e.g., "photographer."

Normalization can be used to reduce the size of the data structures that represent the context term lists. For example, if the data structure is a vector with elements that represents a word in a vocabulary, normalization can increase the number of non-zero elements in the vector, thereby reducing processing requirements for clustering operations. The use of a normalization process can improve the overall quality of the clusters generated from a clustering process, and can increase the efficiency of the clustering process.

A variety of clustering techniques can be used to generate the clusters from the context term lists. Example clustering processes are described in more detail with respect to FIG. 4 below.

Once the clusters are determined, the process 200 selects, for each cluster, a representative term (206). The representative term for the cluster is selected based on a ranking of context terms that belong to the cluster. Various ranking processes can be used, and example processes are described in more detail with respect to FIG. 5 below.

The data are stored in the name context data 122. Thereafter, when the system 110 receives a person name as a search query, the process 200 generates query suggestions from the search query and the representative terms for the clusters associated with the name (208). As described above, each query suggesting is a combination of the person name and a representative term.

The clusters of context term lists can also be used to define clusters of resources that refer to the same person (i.e., a name disambiguated among contexts). The clustering of resources according to a disambiguated name facilitates data mining and other information data processing techniques that can satisfy informational needs of users. For example, referencing a cluster of documents that are related to the explorer John Smith, and other clusters of other documents, each of which are related to other early American explorers and settlers (e.g., Henry Hudson, Henry Kelsey and Peter Stuyvesant), facilitates a focused analysis of early American history. Likewise, reference a cluster of documents related to John Smith, the curator of Kew Gardens, and other clusters of other documents that are each related to historical figures of Kew Gardens (e.g., William Aiton, Joseph Banks, and William Hooker) facilitates a study of the history of Kew Gardens.

In some implementations, abuse prevention measures are used to ensure that suggestions with potentially embarrassing or abusive terms are not created for names. For example, in some implementations, only resources that are determined to meet a minimum authority metric for an authority ranking algorithm, and that are determined to meet a minimum quality metric for a quality measurement algorithm can be used. Additionally, content terms can be filtered of certain terms indicative of negative sentiment, sexually-oriented content, and the like.

§2.0 Context Term Selection

Figure 3:
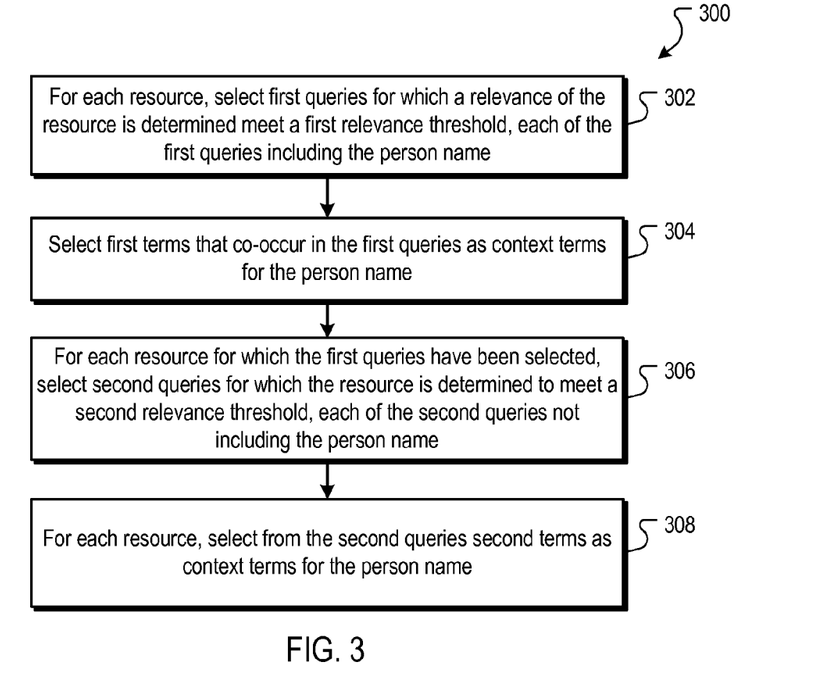
FIG. 3 is a flow diagram of an example process for generating context terms for a person name.

FIG. 3 is a flow diagram of an example process 300 for generating context terms for a person name. For each resource, the process 300 selects first queries for which a relevance of the resource is determined meet a first relevance threshold (302). Each of the first queries includes the person name. For example, by accessing the historical data 114 and the index 112, the name processing subsystem 120 can select queries that include names and the resources that were determine to meet a first relevance threshold for the queries. The first relevance threshold can, for example, be a minimum relevance score, a minimum ranking relative to other resources identified for the query, or some other threshold. At the end of this stage, the name processing subsystem 200 has identified multiple person names from the queries, and multiple resources for each name from which context terms can be determined.

The process 200 selects first terms that co-occur in the first queries as context terms for the person name (304). Each of the first terms are not the person name. For example, for the name John Smith, and for a particular resource, the following queries may have resulted in the resource being identified by search results: John Smith explorer, Pocahontas John Smith, Virginia John Smith, John Smith Dutch wars, etc. Each of these queries may co-occur, i.e., may have been input multiple times, and thus the terms explorer, Pocahontas, Virginia, and Dutch wars are selected as context terms.

For each resource for which the first queries have been selected, the process 300 selects second queries for which the resource is determined meet a second relevance threshold (306). For example, by accessing the historical data 114 and the index 112, the name processing subsystem 120 can select queries for the resource that do not include the name and that are determined to meet the second relevance threshold for the queries. The second relevance threshold can, for example, be a minimum relevance score, a minimum ranking relative to other resources identified for the query, or some other threshold.

Unlike the first queries, each of the second queries does not include the person name. For example, for the particular resource that resulted in the context terms explorer, Pocahontas, Virginia, and Dutch, described above, the second queries may include "Chief Powhatan," "Chesapeake Bay," and "Werowocomoco." Each of these queries may co-occur, i.e., may have been input multiple times, and thus the process 200 selects these terms are selected as context terms (308).

Other ways of identifying context terms can also be implemented. For example, for each resource among the resources selected for a particular name, terms that are determined to be contextually significant among the resources (e.g., by term frequency, inverse document frequency metrics) can be selected as context terms.

Likewise, other ways of generating context term lists can also be implemented. For example, instead of initially using query logs, the name processing subsystem 120 can select person names from a name dictionary, select resources that include the person names (e.g., by causing the search system 110 to identify the resources using a person name as a query), and for each of the top k ranked resources, generate a corresponding context term list for the person name. The context term lists, once the resources are identified, can be generated by processes similar to those described above. For example, for each resource, the query logs can be processed to identify the queries that include the person name and that do not include the person name, and from these queries the context terms can be identified.

§3.0 Clustering Context Terms

Figure 4:
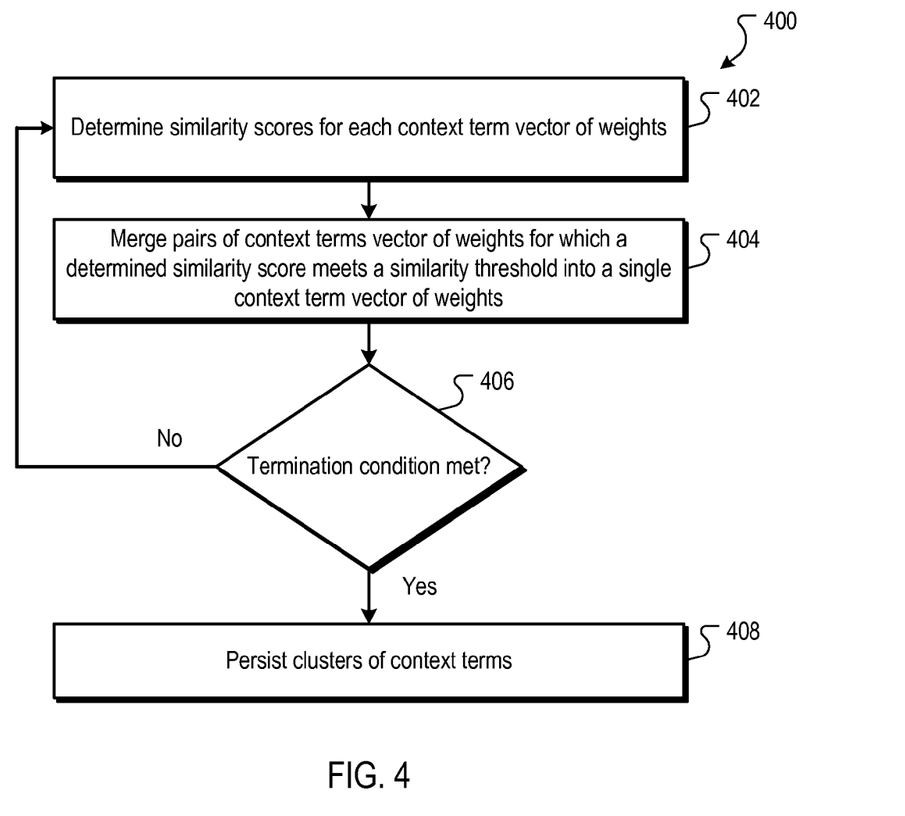
FIG. 4 is a flow diagram of an example process for clustering context terms.

FIG. 4 is a flow diagram of an example process 400 for clustering context terms. A variety of clustering techniques can be used, and the example clustering technique of FIG. 4 involves clustering for context term lists that are represented by a context term vector of weights. Each element of each context term vector corresponds to a context term and has a non-zero value if the context term is represented by the context term list. In some implementations, the non-zero value is a relevance score that measures the relevance of the context term to the resource to which the context term list corresponds. For example, assume that for a particular name, there are 1,000 different context terms among all the context term lists for that name. Each context term list can then be represented by a vector of 1,000 elements, where each element corresponds to one of the context terms. As many of the context term lists will not include all 1,000 terms, many of the elements have a value of 0.

The process 400 determines similarity scores for each context term vector of weights (402). Each similarity score measures the similarity of the context term vector of weights to other context term vector of weights. In some implementations, a cosine similarity function is used to determine the similarity of the context term lists C, according to the following equation:

$$sim(C_i, C_j) \equiv \frac{c_i \cdot c_j}{\|c_i\| \cdot \|c_j\|}$$

where $c_i$ and $c_j$, are two context term vectors representing the context term lists $C_i$ and $C_j$. Other similarity measurements can also be used.

The process 400 merges pairs of context terms vector of weights for which a determined similarity score meets a similarity threshold into a single context term vector of weights (404). For example, the name processing subsystem 120 merges pairs of context term vectors for which a determined similarity score meets a similarity threshold into a single context term vector of weights by summing the pair of context terms vector of weights to form a single context terms vector of weights. The merged vectors form a cluster.

The process 400 iteratively determines similarity scores and merges pairs of context terms vector of weights until a termination condition is met. Thus, after each processing loop, the process 400 determines if a termination condition is met (406). Example termination conditions include an iteration limit being reached, a failure to merge any additional context term vectors, or until the similarity scores between any of the merged context term vectors (which represent clusters) are below the similarity threshold.

In some implementations, the similarity threshold after one or more iterations of determining similarity scores and merging pairs of context terms vector of weights is decreased. Decreasing the similarity score threshold takes into account the dominant interpretation that each cluster (represented by tow or more merged vectors) takes on as its constituent weights are increased as additional vectors are merged into the clusters. A variety of adjustment can be used. For example, the similarity score threshold can be decreased a unit amount after each iteration or after each merger; or can be decreased a unit amount after each $n^{th}$ iteration; or can be decreased in proportion to the largest scalar value of a vector representing a cluster, etc.

If the termination condition is not met, the process 400 continues (402). Conversely, if the termination condition is met, the clusters of context terms are persisted (408).

The process 400 is one clustering example, and other clustering techniques can be used. For example, the name processing system 400 can determine similarity scores for each context term list, select a highest similarity score from among the similarity scores of the context term lists, and merging the context term list with the context term list (or the cluster of context term lists) for which the highest similarity score was determined.

Other clustering techniques, such as k-means clustering, etc., can also be used.

§4.0 Selecting Representative Context Terms

Figure 5:
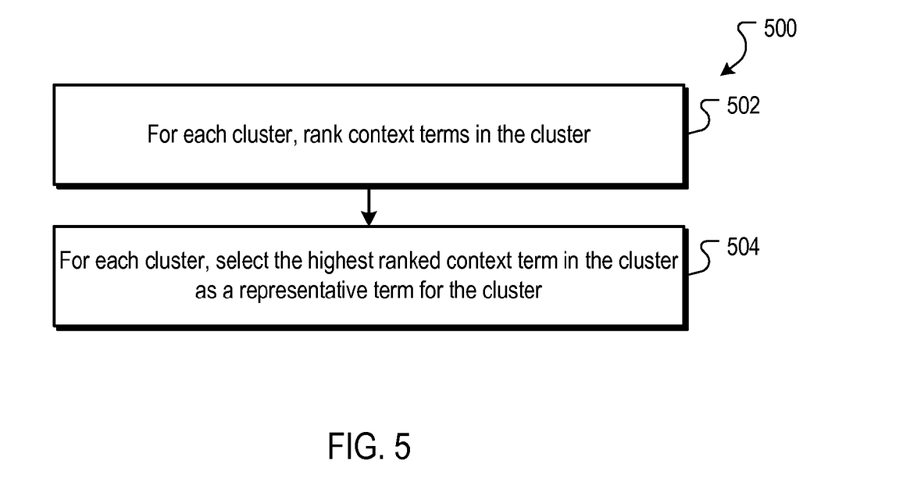
FIG. 5 is a flow diagram of an example process for selecting representative context terms for context term clusters.

FIG. 5 is a flow diagram of an example process 500 for selecting representative context terms for context term clusters. For each cluster, the process 500 ranks the context terms in the cluster (502), and selects the highest ranked context term in the cluster as a representative term for the cluster.

One or more ranking criteria can be used. For example, the context terms can be ranked based on the sum of the relevance scores associated with the context term in the cluster, and the context term with the highest relevance score can be selected as the representative term. Alternatively or in addition, the relevance score or each context term can be decreased in proportion to an inverse document frequency (IDF) score of the context term derived from the occurrence of the context term in the resources, e.g., a square root of the IDF. Yet another ranking input can be the authority score of an underlying resource that resulted in the context term, or an average of the authority scores of the underlying resources that resulted in the context terms. Still yet another ranking input can be a boost that increases the relevance score of each context term that was included in a query with the person name, as these context terms are strong signals of how users at large perceive a context.

§5.0 Additional Implementation Details

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method performed by a data processing apparatus, the method comprising:
   generating context term lists for a person name, each context term list including a list of context terms that co-occur with the person name in queries to which a resource for the person name is determined to be responsive, and each of the resources to which the context term lists for the person name correspond being different resources, the generating the context term lists comprising:
   for each of the selected resources:
      selecting first queries for which a relevance of the resource is determined to meet a first relevance threshold relative to other resources, each of the first queries including the person name;
      selecting terms that are not the person name and that co-occur with the person name in the first queries as context terms for the person name and the resource;
      selecting second queries for which a relevance of the resource is determined meet a second relevance threshold, each of the second queries not including the person name;
      selecting terms from the second queries as context terms for the person name and the resource; and
      generating a respective context term list for the resource and for the person name from the context terms selected from the first queries and the second queries;
   clustering the context term lists into a plurality of clusters, each of the clusters of context term lists including context term lists that are most similar to the cluster relative to other clusters, the clustering comprising iteratively determining a measure of similarity between pairs of context term lists based on the context terms in the pairs of lists and merging context term lists based on the measures of similarity;
   selecting from each of the clusters, a respective context term, the respective context term being a representative context term for the cluster;
   receiving the person name as a search query; and
   generating a plurality of query suggestions from the search query and the representative terms for the clusters, each query suggesting being a combination of the person name and one representative term.

2. The method of claim 1, wherein generating context term lists further comprises:
   for each resource, identifying third terms that are determined to be contextually significant among the resources; and
   selecting the third terms as context terms for the person name.

3. The method of claim 1, wherein:
   each context term list comprises a context term vector of weights, each element of each context term vector corresponding to a context term and having a non-zero value if the context term is represented by the context term list, the non-zero value being a relevance score that measures the relevance of the context term to the resource to which the context term list corresponds;
   determining a measure of similarity between pairs of context term lists based on the context terms in the pairs of lists and merging context term lists based on the measures of similarity comprises:
      determining similarity scores for the context term vector of weights for the corresponding pairs of context term lists, each similarity score measuring the similarity of the context term vector of weights of the corresponding pairs of context term lists;
      merging pairs of context terms vector of weights for which a determined similarity score meets a similarity threshold into a single context term vector of weights.

4. The method of claim 3, wherein merging pairs of context terms vector of weights for which a determined similarity score meets a similarity threshold into a single context term vector of weights comprises summing the pair of context terms vector of weights to form a single context terms vector of weights.

5. The method of claim 3, further comprising decreasing the similarity threshold after one or more iterations of determining similarity scores and merging pairs of context terms vector of weights.

6. The method of claim 3, wherein clustering the context term lists into the plurality of clusters comprises, prior to determining similarity scores:
  determining groups of similar context terms from the context term lists; and
  for each group of similar context terms, normalizing the context terms in the context term lists to a common context term.

7. The method of claim 4, wherein for each of the clusters, selecting a representative term for the cluster comprises:
  ranking the context terms in the cluster; and
  selecting a highest ranking context term in the cluster as the representative term.

8. The method of claim 7, wherein ranking the context terms in the cluster comprises:
  ranking the context terms based on the sum of the relevance scores associated with the context term in the cluster.

9. The method of claim 8, wherein ranking the context terms in the cluster comprises:
  decreasing the relevance score of each context term in proportion to an inverse document frequency score of the context term derived from the occurrence of the context term in the resources.

10. The method of claim 9, wherein ranking the context terms in the cluster comprises:
  increasing the relevance score of each context term in proportion an authority score of each resource in which the context term occurs, the authority score measuring the importance of the resource relative to other resources.

11. The method of claim 9, wherein ranking the context terms in the cluster comprises:
  increasing the relevance score of each context term that was included in a query with the person name.

12. The method of claim 1, wherein the relevance threshold is one of:
  a minimum relevance score relative to relevance scores of other resources identified for the respective first query; and
  a minimum ranking relative to rankings of other resources identified for the respective first query.

13. A non-transitory computer readable storage device storing instructions executable by a data processing apparatus, and upon such execution cause the data process apparatus to perform operations comprising:
  generating context term lists for a person name, each context term list including a list of context terms that co-occur with the person name in queries to which a resource for the person name is determined to be responsive, and each of the resources to which the context term lists for the person name correspond being different resources, the generating the context term lists comprising:
  for each of the selected resources:
    selecting first queries for which a relevance of the resource is determined to meet a first relevance threshold relative to other resources, each of the first queries including the person name;
      selecting terms that are not the person name and that co-occur with the person name in the first queries as context terms for the person name and the resource;
    selecting second queries for which a relevance of the resource is determined meet a second relevance threshold, each of the second queries not including the person name;
    selecting terms from the second queries as context terms for the person name and the resource; and
    generating a respective context term list for the resource and for the person name from the context terms selected from the first queries and the second queries;
  clustering the context term lists into a plurality of clusters, each of the clusters of context term lists including context term lists that are most similar to the cluster relative to other clusters, the clustering comprising iteratively determining a measure of similarity between pairs of context term lists based on the context terms in the pairs of lists and merging context term lists based on the measures of similarity;
  selecting from each of the clusters, a respective context term, the respective context term being a representative context term for the cluster;
  receiving the person name as a search query; and
  generating a plurality of query suggestions from the search query and the representative terms for the clusters, each query suggesting being a combination of the person name and one representative term.

14. The non-transitory computer storage medium of claim 13, wherein the relevance threshold is one of:
  a minimum relevance score relative to relevance scores of other resources identified for the respective first query; and
  a minimum ranking relative to rankings of other resources identified for the respective first query.

15. A system, comprising:
  a data processing apparatus; and
  a computer readable storage device including instructions executable by the data processing apparatus and upon such execution cause the data process apparatus to perform operations comprising:
  generating context term lists for a person name, each context term list including a list of context terms that co-occur with the person name in queries to which a resource for the person name is determined to be responsive, and each of the resources to which the context term lists for the person name correspond being different resources, the generating the context term lists comprising:
  for each of the selected resources:
    selecting first queries for which a relevance of the resource is determined to meet a first relevance threshold relative to other resources, each of the first queries including the person name;
    selecting terms that are not the person name and that co-occur with the person name in the first queries as context terms for the person name and the resource;
    selecting second queries for which a relevance of the resource is determined meet a second relevance threshold, each of the second queries not including the person name;
    selecting terms from the second queries as context terms for the person name and the resource; and
    generating a respective context term list for the resource and for the person name from the context terms selected from the first queries and the second queries;
  clustering the context term lists into a plurality of clusters, each of the clusters of context term lists including context term lists that are most similar to the cluster relative to other clusters, the clustering comprising iteratively determining a measure of similarity between pairs of context term lists based on the context terms in the pairs of lists and merging context term lists based on the measures of similarity;

selecting from each of the clusters, a respective context term, the respective context term being a representative context term for the cluster;

receiving the person name as a search query; and generating a plurality of query suggestions from the search query and the representative terms for the clusters, each query suggesting being a combination of the person name and one representative term.

16. The system of claim 15, wherein the relevance threshold is one of:

a minimum relevance score relative to relevance scores of other resources identified for the respective first query; and a minimum ranking relative to rankings of other resources identified for the respective first query.

* * * * *